(12) United States Patent
Hirose

(10) Patent No.: US 8,610,912 B2
(45) Date of Patent: Dec. 17, 2013

(54) IMAGE PROCESSING APPARATUS, INFORMATION PROCESSING APPARATUS, METHODS FOR CONTROLLING THE APPARATUSES, AND STORAGE MEDIUM STORING PROGRAM ALLOWING THE INSTRUCTION OF THE PROCESSING TO BE EXECUTED NEXT WITHOUT WAITING FOR THE COMPLETION OF COOPERATIVE PROCESSING AND ALLOWS CHECKING OF THE PROCESSING STATUS OF COOPERATIVE PROCESSING BEING EXECUTED

(75) Inventor: Hideki Hirose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/302,976

(22) Filed: Nov. 22, 2011

(65) Prior Publication Data

US 2012/0133968 A1 May 31, 2012

(30) Foreign Application Priority Data

Nov. 29, 2010 (JP) ................. 2010-265744

(51) Int. Cl.
G06F 3/12 (2006.01)
G06F 9/46 (2006.01)
H04N 1/00 (2006.01)
H04N 1/46 (2006.01)

(52) U.S. Cl.
USPC ......... 358/1.13; 358/1.15; 358/1.16; 358/1.6; 358/508; 718/102; 718/104; 718/105; 718/106

(58) Field of Classification Search
USPC ............... 358/1.13, 1.15, 402, 401, 1.16, 1.6, 358/508, 524, 426.02, 426.05, 4, 48, 476, 358/305; 707/600, 607, 609, 608, 611, 705, 707/736, 758, 790, 792, 802, 821, 822, 707/823; 709/201, 205, 208, 212, 213, 216, 709/217, 218, 219, 220, 223, 227, 230, 231, 709/232, 238, 248, 249, 250, 200; 718/106, 718/104, 105, 102, 107
See application file for complete search history.

(56) References Cited

U.S. PATENT DOCUMENTS

| 2005/0105129 A1* | 5/2005 | Takahashi | 358/1.15 |
| 2005/0204044 A1* | 9/2005 | Araki | 709/227 |
| 2008/0174819 A1* | 7/2008 | Hada | 358/1.15 |
| 2008/0259384 A1* | 10/2008 | Ito | 358/1.15 |

FOREIGN PATENT DOCUMENTS

JP   2006-203870 A   8/2006

* cited by examiner

Primary Examiner — Ngon Nguyen
(74) Attorney, Agent, or Firm — Canon U.S.A., Inc. IP Division

(57) ABSTRACT

An image processing apparatus displays a screen for designating cooperative processing in which the image processing apparatus and at least one other image processing apparatus cooperate based on externally received information, where if an execution instruction for processing to be executed by the image processing apparatus for the cooperative processing is received, the processing is executed. A screen displaying the status of processing in the at least one other image processing apparatus and a screen enabling designation of subsequent processing to be executed by the image processing apparatus are displayed based on the externally received screen information while the at least one other image processing apparatus is executing processing to be executed by the at least one other image processing apparatus for the cooperative processing after the execution of the processing.

10 Claims, 11 Drawing Sheets

FIG. 9

| JOB | JOB ID | SUB-JOB | DEVICE | SUB-JOB ID | STATUS |
|---|---|---|---|---|---|
| REMOTE COPY | XXXXX | SCAN TO FTP | MFP 102 | YYYY | END |
| | | Pull Print P | MFP 103 | ZZZZ | EXECUTING |

IMAGE PROCESSING APPARATUS, INFORMATION PROCESSING APPARATUS, METHODS FOR CONTROLLING THE APPARATUSES, AND STORAGE MEDIUM STORING PROGRAM ALLOWING THE INSTRUCTION OF THE PROCESSING TO BE EXECUTED NEXT WITHOUT WAITING FOR THE COMPLETION OF COOPERATIVE PROCESSING AND ALLOWS CHECKING OF THE PROCESSING STATUS OF COOPERATIVE PROCESSING BEING EXECUTED

BACKGROUND OF THE INVENTION

1. Field of the Invention

The present invention relates to an image processing apparatus, an information processing apparatus which can communicate with a first image processing apparatus and a second image processing apparatus, and a recording medium which records a control method and program.

2. Description of the Related Art

It is known that an information processing apparatus such as a PC is connected to a Web server on a network and an operation screen provided by the Web server is displayed on the Web browser included in the information processing apparatus. In this case, the Web browser in the information processing apparatus requests the Web server the operation screen. In response to the request from the information processing apparatus, a Web application on the Web server transmits an HTML file for displaying the operation screen to Web browser in the information processing apparatus.

The Web browser in the information processing apparatus analyzes the received HTML file and displays the operation screen based on the description of the received HTML file. If a user uses the operation screen displayed on the Web browser to input an instruction, the Web browser notifies the input instruction to the Web server. The corresponding Web application on the notified Web server performs processing in accordance with the instruction.

Many current multi-function peripherals (MFPs) that include a scanner and/or a printer may include a Web browser as described above. The MFP may use the routine as described above to display an operation screen provided by the Web server on the Web browser of the MFP and receive instructions from a user. An instruction input on the operation screen by a user is notified by the Web browser of the MFP to the Web server. The notified Web server requests the execution of processing to the MFP in accordance with the instruction input from the user. The MFP in response to the request executes the requested processing. This may eliminate the necessity for holding the entire menu data for operating the MFP within the MFP, and the menu data may be changed only by changing the corresponding Web server.

An extension of the technology has been provided in which one job is cooperatively processed by a plurality of MFPs instead of only one MFP (for example, Japanese Patent Lad-Open No. 2006-203870).

However, according to the art in Japanese Patent Lad-Open No. 2006-203870, the MFPs may not accept the instruction for the next job until the job to be executed by the cooperative processing completes. In an example of cooperative processing to be executed between an MFP 1 and an MFP 2, it is assumed that a remote copy job is instructed to read a manuscript and generate image data in the MFP 1, transmit the image data to the MFP 2, and print it on the MFP 2. In this case, the processing to be executed in the MFP 1 is manuscript reading and image data transmission. The processing to be executed by the MFP 2 is image data printing. On an operation screen of the MFP 1, job status screen is continuously displayed until the remote copy job completes, that is, until the printing processing in the MFP 2 completes. Thus, until the job to be executed by the cooperative processing completes, the next job may not be instructed in the MFP 1.

On the other hand, if the operation screen shifts to a screen for an instruction relating to the next job when the processing to be executed by the MFP 1 ends, without waiting for the completion of the job to be executed by the cooperative processing, a user of the MFP 1 may not check the status of the job by the cooperative processing.

SUMMARY OF THE INVENTION

The present invention was made in order to solve the above-described problem(s) and relates to an image processing apparatus which displays an operation screen provided by an external device such as a Web server and operates in response to a manipulation on the operation screen. The present invention provides an image processing apparatus which allows the instruction of the processing to be executed next without waiting for the completion of cooperative processing if a plurality of image processing apparatuses perform cooperative processing and allows checking of the processing status of cooperative processing being executed. The present invention further relates to an information processing apparatus which provides an operation screen to be displayed on an image processing apparatus. The present invention further provides an information processing apparatus which allows the instruction of the processing to be executed next when a plurality of image processing apparatuses execute cooperative processing, without waiting for the completion of the cooperative processing and may provide an operation screen which allows check of the processing status of the cooperative processing being executed.

According to a first aspect of the present invention, there is provided an image processing apparatus including an operation unit that displays a screen for designating cooperative processing in which the image processing apparatus and at least one other image processing apparatus cooperate based on externally received information, an interface unit that, if the cooperative processing is designated on the screen, receives an execution instruction for processing to be executed by the image processing apparatus for the cooperative processing, and a processing unit that executes the processing in accordance with the execution instruction received by the interface unit, wherein the operation unit displays a status of processing in the at least one other image processing apparatus and controls enabling designation of subsequent processing to be executed by the image processing apparatus based on the received information while the at least one other image processing apparatus is executing processing to be executed by the at least one other image processing apparatus for the cooperative processing after the execution of the processing by the executing unit.

Further features of the present invention will become apparent from the following description of exemplary embodiments with reference to the attached drawings.

BRIEF DESCRIPTION OF THE DRAWINGS

FIG. 9 illustrates an example of a job management table according to an exemplary embodiment of the present invention.

DESCRIPTION OF THE EMBODIMENTS

Figure 1:
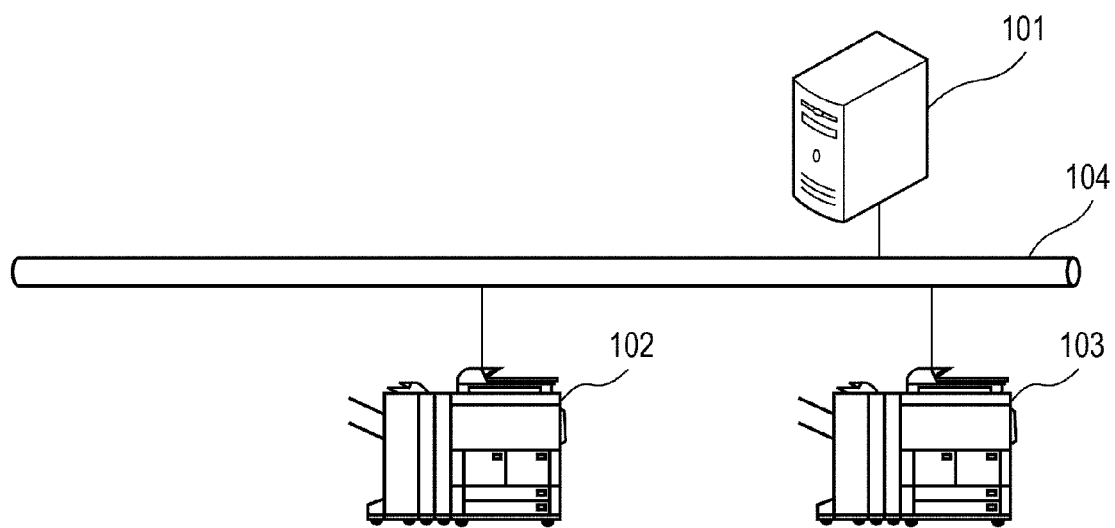
FIG. 1 is a general view of a Web system according to an exemplary embodiment of the present invention.

A first exemplary embodiment of the present invention will now be described. FIG. 1 illustrates a configuration example of a Web system according to the present embodiment. The Web system includes a Web server 101 and MFPs 102 and 103 which perform processing in accordance with an instruction from an external device such as the Web server 101. A LAN (Local Area Network) 104 connects the Web server 101 and the MFPs 102 and 103. The Web server 101 and MFPs 102 and 103 are mutually communicable through the LAN. The MFPs 102 and 103 are examples of an image processing apparatus and may be other types of image processing apparatuses such as a printer, a scanner, a FAX, or a copier. The Web server 101 may be an information processing apparatus having a Web server function such as a printer, without limiting it to being a computer such as a PC. The LAN 101 may be a communication unit for the Internet or radio communication, for example.

Before describing an example of cooperative processing by a plurality of MFPs (102, 103) and the Web server 101, an example of processing in a Web system including one MFP 102 and the Web server 101 will be provided.

Figure 2:
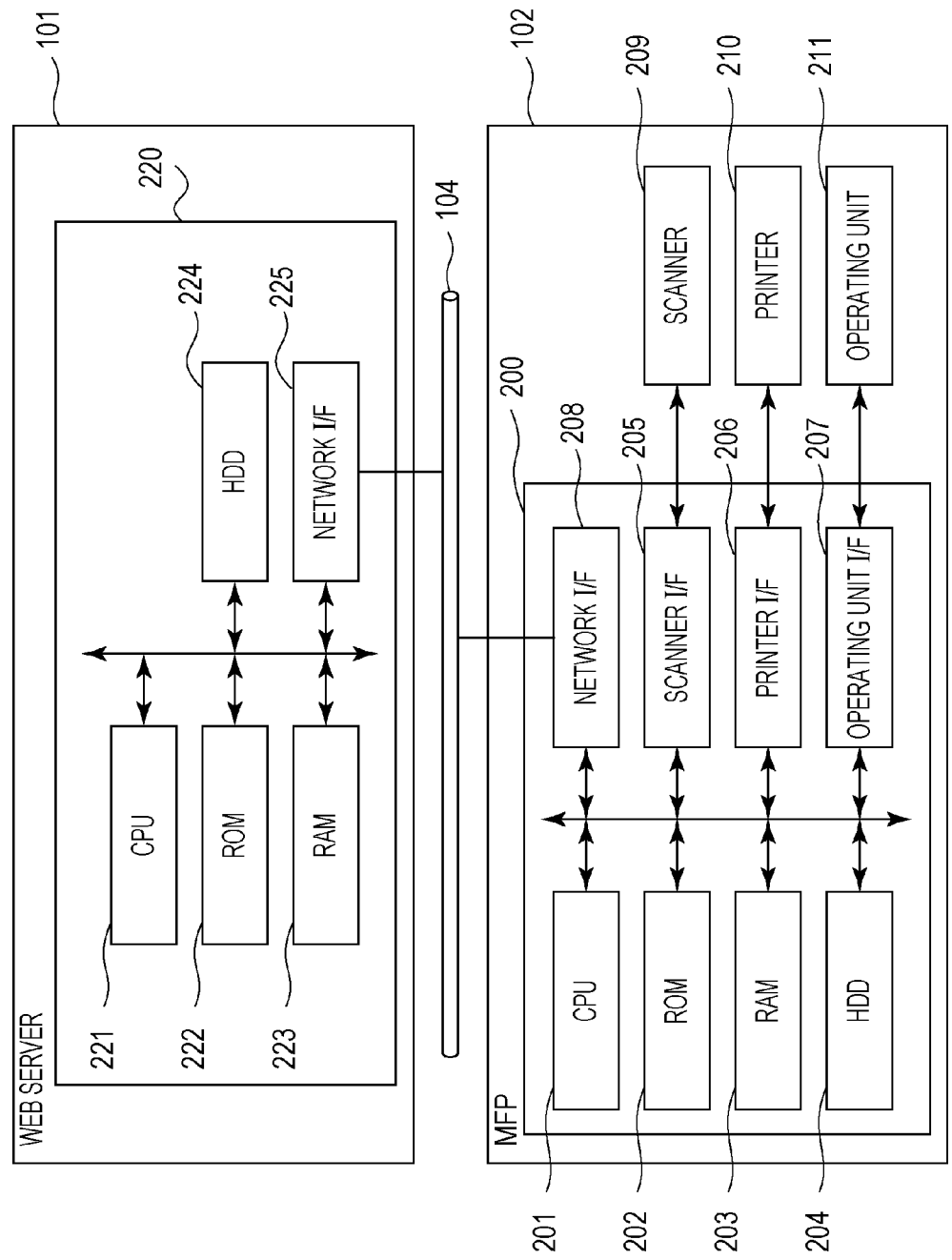
FIG. 2 is a block diagram illustrating hardware configurations of a Web system including a Web server and an MFP according to an exemplary embodiment of the present invention.

FIG. 2 is a block diagram illustrating hardware configurations of the Web server 101 and MFP 102. The block diagram of the MFP 102 will be described first. A controller 200 is responsible for control over a scanner 209, a printer 210 and an operating unit 211. A CPU 201 controls the operations of the entire MFP 102. The CPU 201 reads a control program stored in a ROM 202 or HDD 204 onto a RAM 203 to execute control processing such as reading control and printing control. The RAM 203 may be used as a temporary storage area of a main memory and a work area of the CPU 201, for example. The HDD 204 may store image data and a program, for example.

A network I/F 208 connects the controller 200 to the LAN 104. The network I/F 208 may transmit image data and/or information to an external device (such as the Web server 101 and an MFP) on the LAN 104 and receive information from an external device on the LAN 104.

A scanner I/F 205 connects the scanner 209 and the controller 200. The scanner 209 reads an image on a manuscript, generates image data and inputs it to the controller 200 through the scanner I/F 205.

A printer I/F 206 connects the printer 210 and the controller 200. Image data to be printed by the printer 210 is transmitted from the controller 200 to the printer 210 through the printer I/F 206. In the printer 210, the image data is printed on a recording medium.

An operating unit I/F 207 connects the operating unit 211 and the controller 200. The operating unit 211 has hard keys including a switch and a numeric keypad and a touch panel LCD display unit. In response to a manipulation on the hard key and/or touch panel, the information input through the operating unit 211 is transmitted through an operating unit I/F 207 to the CPU 201, and the corresponding processing is executed. With that, a display unit (not illustrated) included in the operating unit 211 displays information.

Next, the block diagram of the Web server 101 will be described. The control unit 220 including the CPU 221 controls the operations of the entire Web server 101. The CPU 221 reads a control program stored in a ROM 222 or HDD 224 onto the RAM 223 and executes control processing. The RAM 203 may be used as a temporary storage area of a main memory and a work area of CPU 221. The HDD 224 may store image data, a program, or a management table, which will be described below. A network I/F 225 connects the control unit 220 to the LAN 104. The network I/F 225 exchanges information with other apparatuses on the LAN 104.

Figure 3:
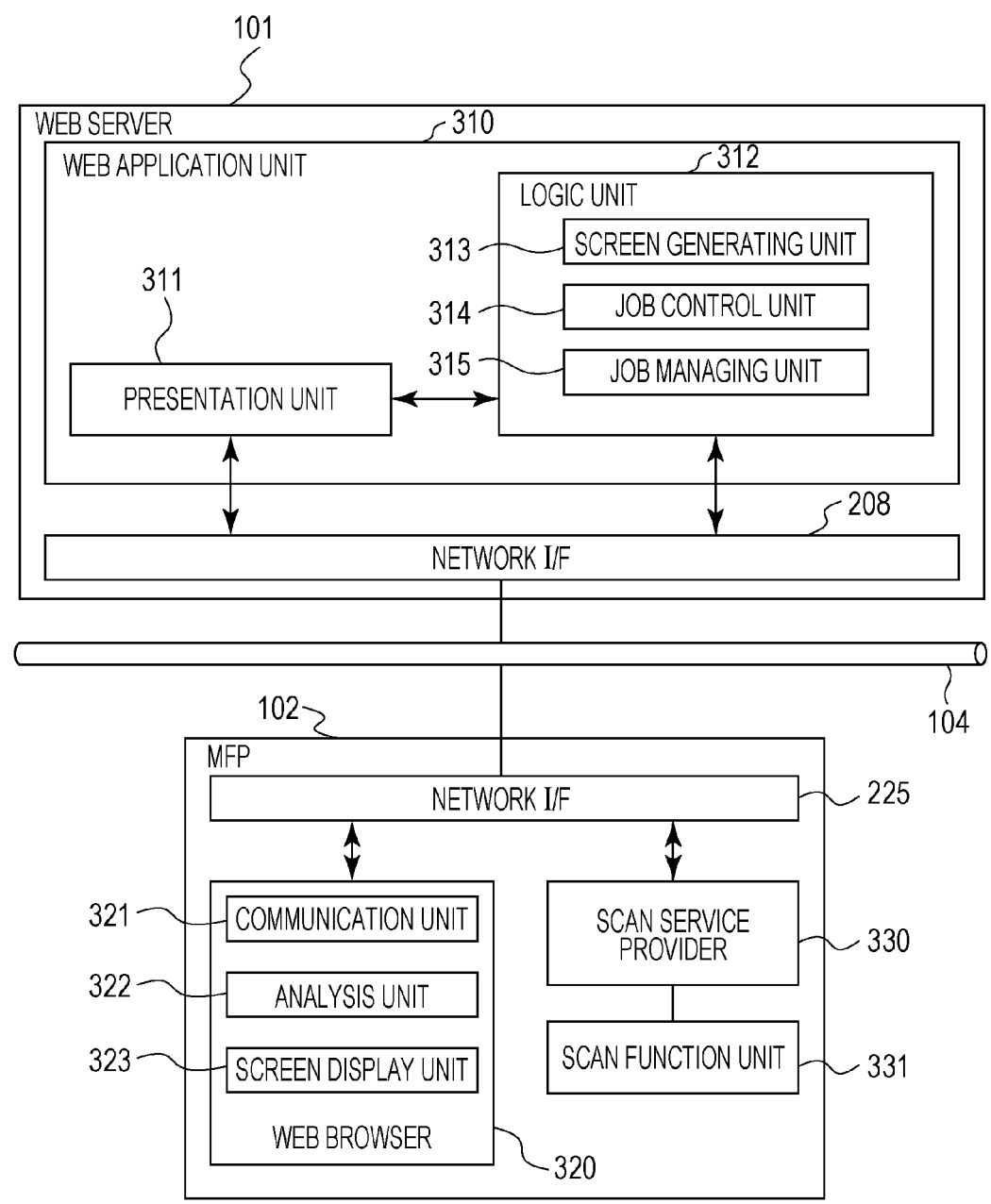
FIG. 3 illustrates a software configuration of a Web system including a Web server and an MFP according to an exemplary embodiment of the present invention.

FIG. 3 is a diagram for explaining the software configuration of a Web system including one MFP 102 and the Web server 101. The function units illustrated in FIG. 3 may be implemented by the execution of control programs by the CPU 201 and CPU 221 in the MFP 102 and Web server 101.

The MFP 102 includes the network I/F 225, a Web browser 320, a scan service provider 330, and a scan function unit 331. The Web browser 320 has a communication unit 321, an analyzing unit 322, and a screen display unit 323. The communication unit 321 communicates with a presentation unit 311 in a Web application 310 in accordance with an HTTP protocol. More specifically, the communication unit 321 transmits to the Web application 310 a request message which requests an operation screen to be displayed on the Web browser 320. The communication unit 321 receives a response message transmitted from the Web application 310.

The analyzing unit 322 analyzes a response message received from the Web application 310. The response message contains HTML data which is screen information. The HTML data contains descriptions of details of the operation screen to be displayed on the Web browser 320.

The screen display unit 323 displays the operation screen on the operating unit 211 based on the analysis result of the HTML data. The screen information received from the Web application 310 is not limited to being HTML data, and may be data in other formats.

The scan service provider 330 is a service application which operates the scan function unit 331 in the MFP 102 in response to an instruction from an external device. More specifically, an instruction from the Web browser 320 is received by the Web application 310, and the job control unit 314 uses the scan function unit 331 in the MFP 102. When the execution status of the job being processed by the scan function unit 331 changes, the execution status is received from the scan function unit 331 and is notified to the job control unit 314 in the Web server 101.

The scan function unit 331 is a software function which controls the scanner 209 through the scanner I/F 205.

The service providers may include a print service provider 640, which will be described below, and a copy service provider and a FAX service provider (not shown) for different functions in addition to the scan service provider 330.

The network I/F 225 is connected to the LAN 104 and forwards data received from the Web server 101 to the Web browser 320 and scan service provider 330. Conversely, the network I/F 225 receives an HTTP request from the Web browser 320 or a status response from the scan service provider 330, for example, and transmits it to the Web server 101.

Next, software functions of the Web server 101 will be described. The Web server 101 includes a Web application unit 310 and a network I/F 208. The Web application unit 310 is implemented by execution of a control program by the CPU 221 in the Web server 101.

The network I/F 208 is connected to the LAN 104 and allots data received from the MFP 102 to the presentation unit 311 and the logic unit 312, for example. Conversely, the network I/F 208 transmits an HTTP response from the presentation unit 311 or a job execution instruction from the logic unit 312 to the MFP 102.

The Web application unit 310 receives an HTTP request transmitted from the Web browser 320 and analyzes and processes the received HTTP request. The processing result is transmitted from the Web application 310 to the Web browser 320 as an HTTP response.

The Web application unit 310 includes a presentation unit 311 and a logic unit 312. The presentation unit 311 communicates with the communication unit 321 and receives an HTTP request transmitted from the MFP 102. Next, the presentation unit 311 provides the received HTTP request to the logic unit 312 and waits for a response from the logic unit 312. The presentation unit 311, after receipt of a response from the logic unit 312, transmits as a response, the HTML data corresponding to the operation screen to be displayed on the Web browser 320 of the MFP 102 in accordance with the response information.

The logic unit 312 includes a screen generating unit 313, a job control unit 314 and a job managing unit 315. The job control unit 314 performs processing in accordance with the HTTP request provided by the presentation unit 311 and issues an execution instruction for a job to the scan service provider 330 in the MFP 102. The job control unit 314 further receives the execution status of the job transmitted from the scan service provider 330. More specifically, the execution status may be information on a status such as the execution of reading processing by the MFP 102 and the end of reading or an error status. The job managing unit 315 manages a job requested form the MFP 102 and uses a job management table to manage job IDs and manage the statuses of jobs in the MFP 102. In accordance with the HTTP request provided by the presentation unit 311, the screen generating unit 313 generates the HTML data corresponding to the operation screen to be displayed in the MFP 102 and transmits it to the presentation unit 311. Various HTML data are generated in accordance with the job management table managed by the job managing unit 315, the details of which will be described below.

Next, a flow of processing in a Web system including one MFP 102 and the Web server 101 will be described.

Figure 4:
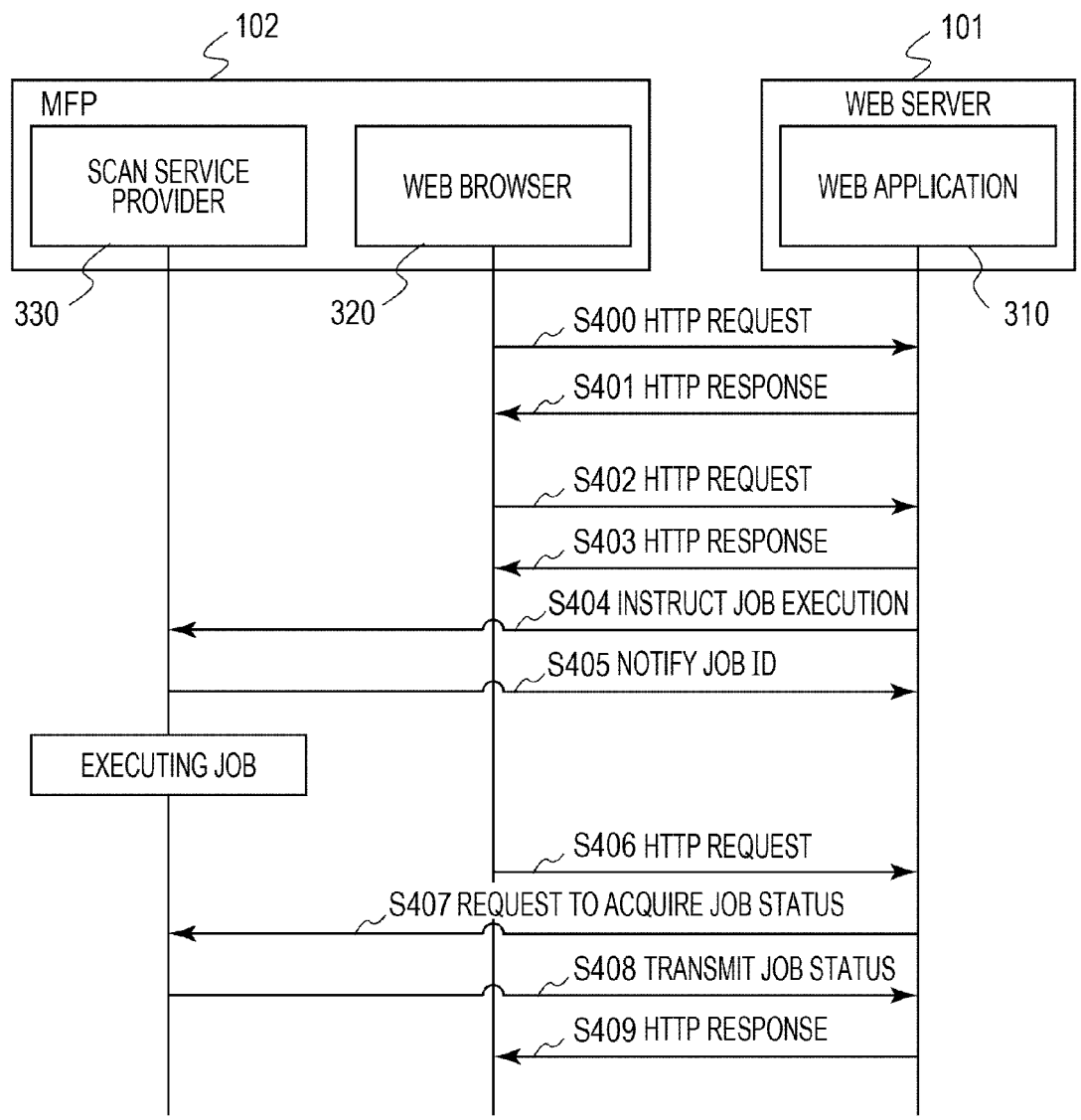
FIG. 4 is a sequence diagram illustrating processing in a Web system including a Web server and one MFP according to an exemplary embodiment of the present invention.

FIG. 4 is a sequence diagram illustrating a flow of a series of operations in a Web system including one MFP 102 and the Web server 101 according to the present embodiment.

First, the Web browser 320 in the MFP 102 is started by a user. The Web browser 320 transmits an HTTP request to the Web application unit 310 in step S400. The Web application 310 in the Web server 101 receives the HTTP request. The Web application 310, after receipt of the HTTP request, generates HTML data of the screen to be displayed on the Web browser 320. In step S401, the Web application 310 transmits the generated HTML data as an HTTP response to the Web browser 320. The Web browser 320 receives the HTML data as an HTTP response. The Web browser 320 analyzes the received HTML data and displays the operation screen.

Next, a user may manipulate the operation screen displayed on the Web browser 320 in the MFP 102 to select a desirable job and issues an execution instruction. It is assumed here that a job of transmitting image data of a manuscript read by the scanner 209 by E-Mail to a predetermined destination, e.g., a PC used by the user is to be performed. If a user issues the execution instruction through the operation screen displayed on the Web browser 320, the Web browser 320 in step S402 re-transmits the HTTP request to the Web application unit 311. The HTTP request contains the execution instruction for the transmission job. The Web application 310 receives the HTTP request. The Web application 310 generates the HTML data on the screen to be displayed on the Web browser 320. In step S403, the Web application 310 transmits the generated HTML data as an HTTP response to the Web browser 320. The transmitted HTML data contains a script for refreshing the screen on a predetermined period of time basis. The HTML data displays a screen displaying "PROCESSING", for example, on the Web browser 320. In S404, the Web server 101, more specifically, the logic unit 312 in the Web server 101 transmits the execution instruction for the transmission job to the scan service provider 330 in the MFP 102 at the same or as close to the time to step S403.

If the scan service provider 330 receives the execution instruction transmitted in step S404, the scan service provider 330 assigns a new job ID to the job to be executed for management. In S405, the scan service provider 330 transmits the newly assigned job ID to the Web application 310. The scan service provider 330 operates the function unit corresponding to the designated job to start the job.

After the lapse of a predetermined period of time from the HTTP response in step S403, the Web browser 320 re-transmits the HTTP request to the Web application 310 to refresh the screen.

The Web application 310 receives the HTTP request transmitted from the Web browser 320 in S406. The Web application 310 sends an inquiry to the scan service provider 330 as to the execution status of the job instructed to execute in S404 (S407). The inquiry contains the designated job ID transmitted from the scan service provider 330 in S405. The scan service provider 330, after receipt of the inquiry, acquires the execution status of the job corresponding to the designated job ID from the scan function unit 331 and transmits the information as status information to the Web application 310 (S408). If the Web application 310 receives the transmitted status information, the Web application 310 generates the HTML data of the screen corresponding to the status of the job described by the status information. The Web application 310 transmits the generated HTML data to the Web browser 320 as the HTTP response to the HTTP request in S406 (S409). The HTML data generated here may be HTML data for displaying "END OF PROCESSING" on the screen if the transmitted status is "end of job". For example, if the transmitted status is "job in processing" the HTML data is for displaying "IN PROCESSING" on the screen. Until the transmitted status becomes "End of Job", the processing from S406 to S409 is repeated.

Figure 5:
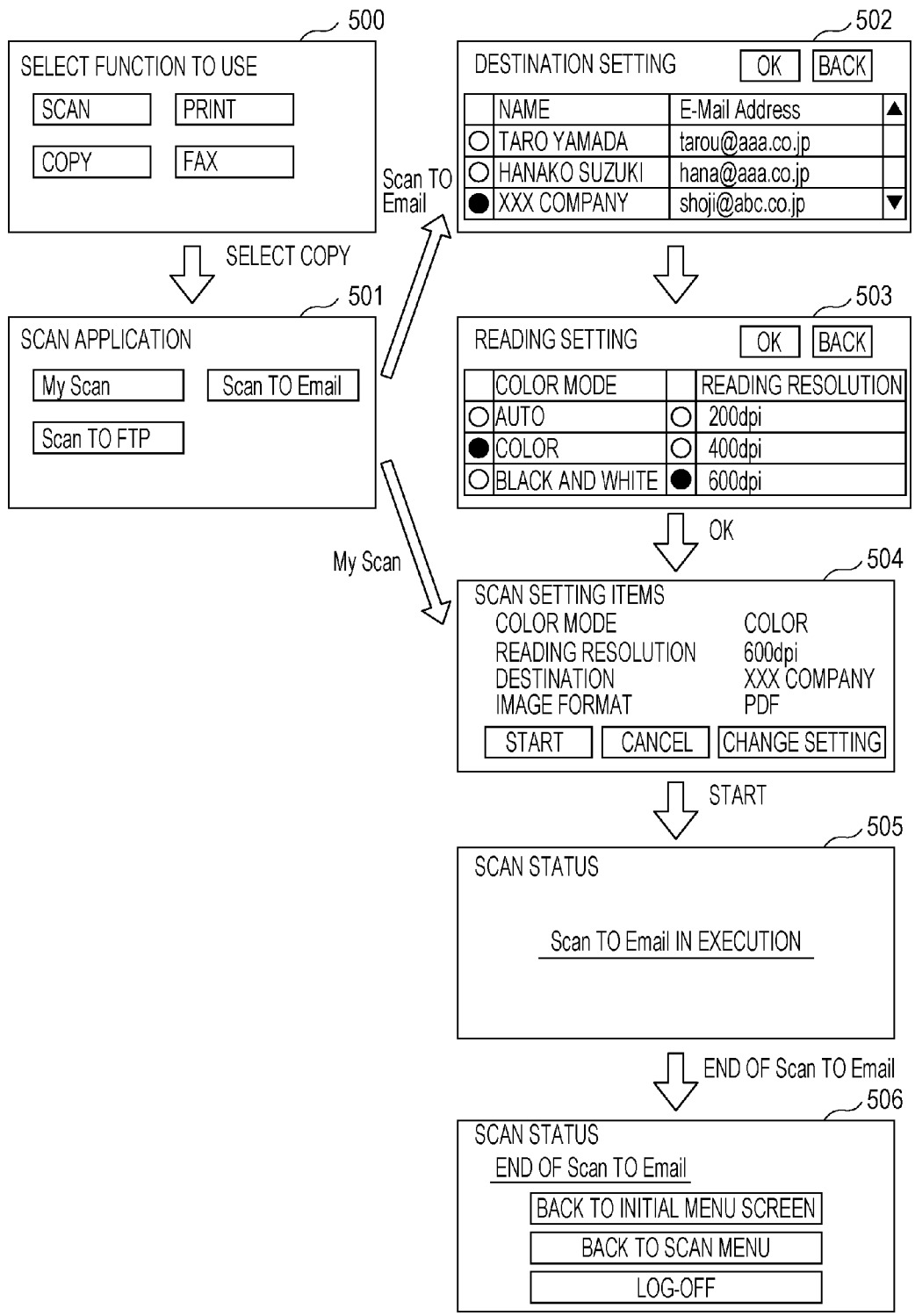
FIG. 5 is a diagram illustrating screen shifts during a series of operations in a Web system including a Web server and an MFP according to an exemplary embodiment of the present invention.

FIG. 5 illustrates an example of shifting between screens during a series of operations in the Web system including MFP 102 and the Web server 101 according to the present embodiment. The screens are displayed on the Web browser 320 based on the HTML data generated by the Web application 310 in the Web server 101 and shift in response to a user operation or a control script.

A menu screen 500 is a screen for a user to select which function is to be used in order to use a function provided by the MFP 102. For example, when a button corresponding to a function is pressed on the touch panel, the display shifts to the screen corresponding to the selected function. For description purposes, it is assumed that a scan function is selected, which causes the display to shift to a scan application screen 501.

The scan application screen 501 is a screen for selecting a Web application relating to a scan function. On this screen, "My Scan" is a function for performing scan processing by using pre-registered settings such as, for example, the destination and reading setting. When the Web application is selected, the setting using a destination setting screen 502 or reading setting screen 503 may be omitted. It is assumed that a user selects a "Scan To Email" function and that the display shifts to the destination setting screen 502. The "Scan To Email" function may transmit by e-mail the image data generated by reading a manuscript as an attached file.

The destination setting screen 502 is a screen for selecting the destination of an email to be transmitted. A user selects an intended destination, presses an OK button, and the display shifts to a reading setting screen 503.

The reading setting screen 503 is a screen for selecting reading settings for a scanner. If a user selects a desirable setting and then presses an OK button, the display shifts to a scan setting check screen 504. A user may check the settings on the scan setting check screen 504 and press a start button if there are no problems with the settings. If the start button is pressed on the scan setting check screen 504, the "Scan To Email" job is executed. The display then shifts to a scan status screen 505. In response to pressing the start button, the Web browser 320 transmits an HTTP request containing the execution instruction for the "Scan To Email" job to the Web application 310. If the execution of the "Scan To Email" job is instructed from the Web application 310 in response thereto, the scan service provider starts the job. Based on the HTML data transmitted from the Web application 310, the scan status screen 505 is displayed.

Next, the control script causes the Web browser 320 to periodically transmit the HTTP request to the Web application 310 to check the execution status of the job. When the "Scan To Email" job ends, the display shifts to an end-of-job screen 506, prompting a user for the next operation.

The present embodiment has described the flow of a series of operations in a Web system including one MFP 102 and the Web server 101. Next, another exemplary embodiment will describe cooperative processing by a plurality of MFPs (102, 103) and the Web server 101.

When a plurality of MFPs is present, one MFP can be designated the link source apparatus while the remaining MFPs can be designated as the link destination apparatuses. In a cooperative processing system, the link source apparatus is typically the apparatus where functions, such as copying, scanning, printing, etc., are initiated/designated, and the link destination apparatus is where all or some of the function is performed. In the following exemplary embodiment descriptions, MFP 102 sometimes be referred to as the link source apparatus and MFP 103 may sometimes be referred to as the link destination apparatus.

Figure 6:
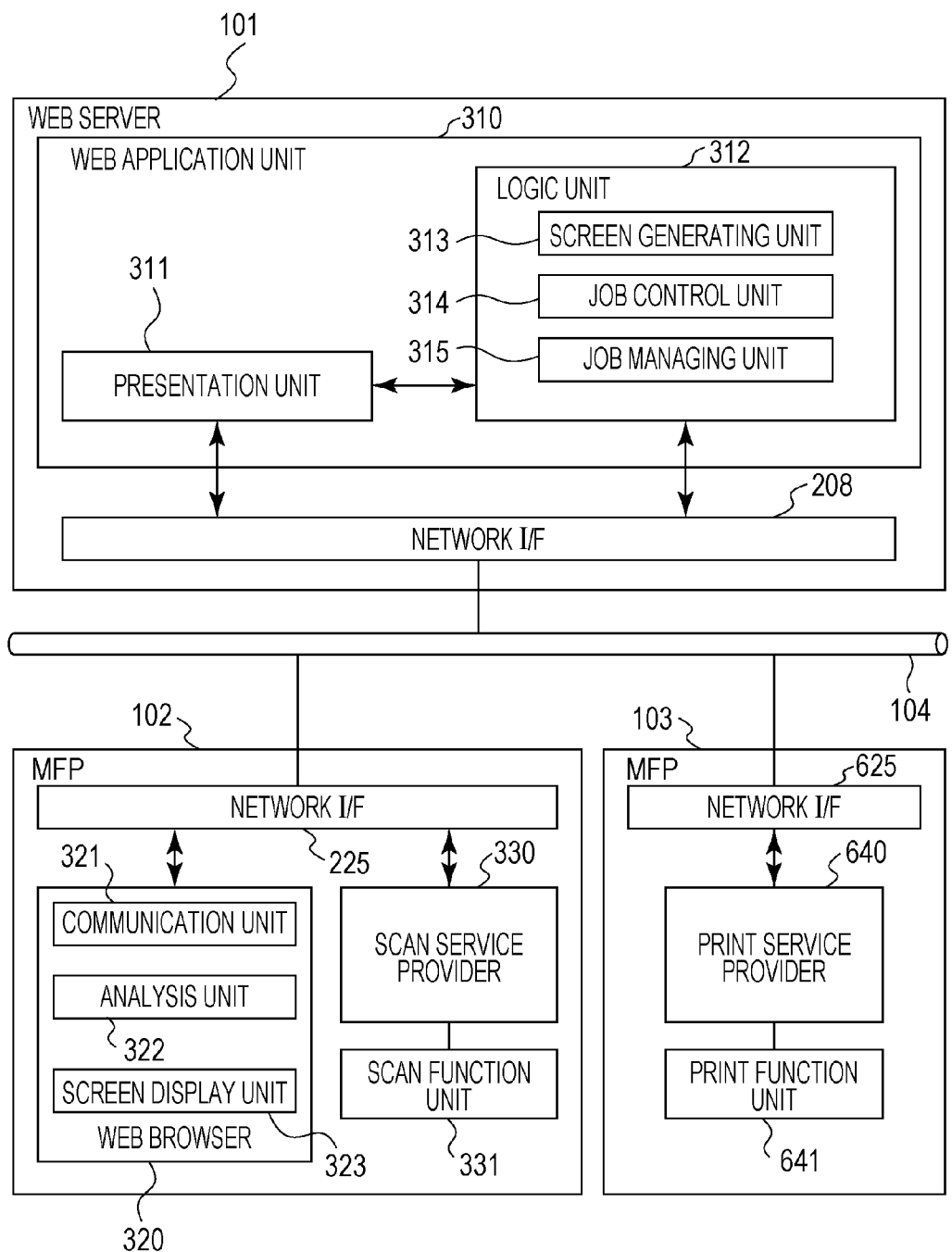
FIG. 6 illustrates a software configuration of a Web system including a Web server and two MFPs according to an exemplary embodiment of the present invention.

FIG. 6 is a diagram illustrating a software configuration of a Web system including two MFPs 102 and 103 and the Web server 101. The software configuration illustrated in FIG. 6 is similar to that illustrated in FIG. 3, and thus, only the differences will be described herein. Because the hardware configuration of MFP 103 is the same as the hardware configuration of MFP 102, the hardware configuration description of MFP 102 will be omitted herein. The function units illustrated in FIG. 6 are implemented by execution of control programs by the CPU 201 and CPU 221 in MFP 102 and MFP 103 and Web server 101.

MFP 103 includes a network I/F 625, a print service provider 640, and a print function unit 641. The MFP 103 may also include, for example, the Web browser 320 and scan service provider 330 (not illustrated).

The network I/F 625 is connected to the LAN 104 and forwards data received from the Web server 101 to, for example, the print service provider 640. Conversely, the network I/F 625 receives, for example, a status response from the print service provider 640 and transmits it to the Web server 101.

The print service provider 640 is a service application which operates the print function unit 641 in the MFP 103 in accordance with an instruction from an external device. More specifically, the Web application 310 receives an instruction from the Web browser 320, and the job control unit 314 uses the print function unit 641 in the MFP 103. When the execution status of the job being processed by the print function unit 641 changes, the execution status is received from the print function unit 641 and provided to the job control unit 314 in the Web server 101. The print function unit 641 is software function which controls the printer 210 through a printer I/F 206.

Next, the processing flow in a Web system including MFP 102, MFP 103, and Web server 101.

Figure 7:
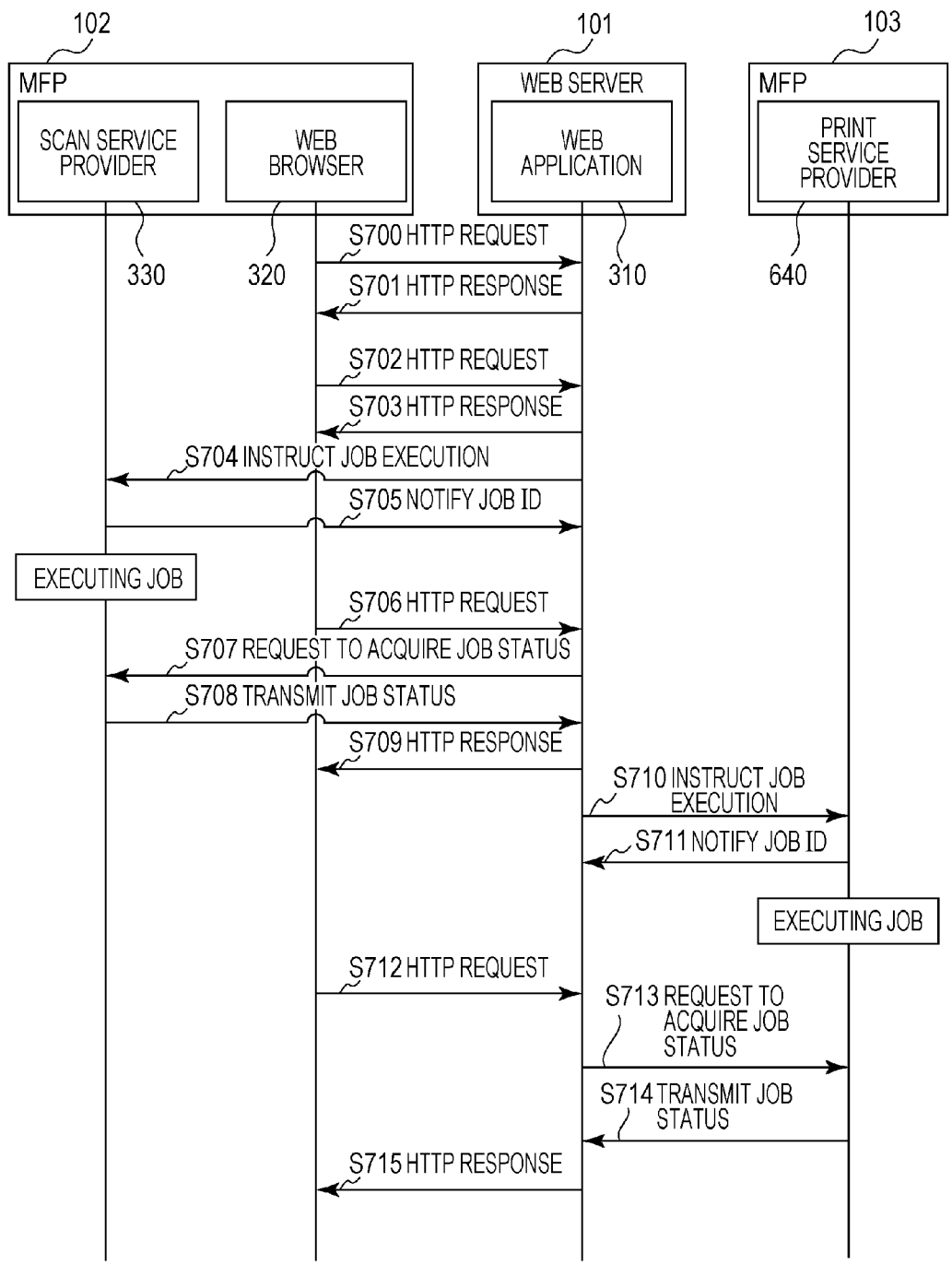
FIG. 7 is a sequence diagram illustrating processing in a Web system including a Web server and two MFPs according to an exemplary embodiment of the present invention.

FIG. 7 is a sequence diagram illustrating a flow of a series of operations in a Web system including MFP 102, MFP 103, and Web server 101 according to the present embodiment. FIG. 4 illustrates the case where the job for transmitting the image data of a manuscript read by the MFP 102 to a predetermined destination by E-Mail is executed. A case will be described below where a job for transmitting the image data of a manuscript read by the MFP 102 to the MFP 103 and printing it in the MFP 103 is to be executed. This job is an example of cooperative processing by a plurality of MFPs. Hereinafter, this job will be referred to as a remote copy job.

Because S700 through S708 are the same as S400 through S408 in FIG. 4, except for the job selected by a user, the description of S700 through S708 is omitted herein.

In step S708, if the Web application 310 receives status information describing the end of reading processing in the MFP 102, the next job to be executed can be designated in the MFP 102. At that time, the job managing unit 315 updates the status information on the job management table.

FIG. 9 illustrates an example of the job management table when a remote copy job is to be executed. A remote copy job is divided into two jobs, "SCAN To FTP" and "Pull Print". The "SCAN To FTP" is a function of transmitting the image data of a manuscript read in the MFP 102 to the Web server 101 by File Transfer Protocol (FTP). The "Pull Print" is a function of the MFP 103 reading the image data stored in the Web server 101 and transmitted from the MFP 102 and printing it in the MFP 103. These two functions are managed as sub-jobs for execution in separate MFPs. Because the sub-jobs have different job IDs, the job ID for each sub-job is managed as a sub-job ID. The two sub-jobs are associated and managed as one remote copy job. The execution statuses of jobs are managed by the job managing unit 315 using the table. In the example in FIG. 9, the execution status of "SCAN To FTP" job in the MFP 102 is "END", and the execution status of the "Pull Print" job in the MFP 103 is "EXECUTING".

If the job managing unit 315 receives an HTTP request indicating the job selected by a user and the job is a job to be executed by cooperative processing, the devices for executing the cooperative processing may be managed. The screen generating unit 313 generates HTML data to the HTTP request received in step S706. In this case, the screen generating unit 313 refers to the job management table, notifies the execution status of the job to be executed by the MFP 103, and generates HTML data of a screen allowing a user of the MFP 102 to designate the next job to the MFP 102. The HTML data transmitted from the Web application 310 to the Web browser 320 in S709 contains a script for refreshing the screen based on a repeating predetermined period of time. The specific screen shift example will be described below.

In S710, the Web application 310 issues an execution instruction for a "Pull Print" job to the print service provider 640 in the MFP 103. The processing in S710 is performed when the image data generated in and transmitted by the MFP 102 is received by the Web server 101. In other words, it is performed when the "SCAN To FTP" job in the MFP 102 ends.

If the print service provider 640 in the MFP 103 receives the execution instruction transmitted in step S710, the print service provider 640 assigns a new job ID to a job to be executed. In S711, the print service provider 640 transmits the newly assigned job ID to the Web application 310. The print service provider 640 operates the function unit corresponding to the designated job to start the job. According to the above-processing, a "Pull Print" job is executed. The Web application 310 manages the job ID transmitted in S711 as the sub-job ID corresponding to the Pull Print job on the job management table in FIG. 9.

After expiration of a predetermined period of time from the HTTP response in step S709, the Web browser 320 re-transmits the HTTP request to the Web application 310 to refresh the screen (S712).

The Web application 310 receives the HTTP request transmitted from the Web browser 320 in S712. The Web application 310 inquires the print service provider 640 as to the execution status of the job instructed to be executed in S710 (S713). This inquiry contains the designated job ID transmitted from the print service provider 640 in S711. The print service provider 640, after receipt of the inquiry, acquires the execution status of the job corresponding to the designated job ID from the print function unit 641 and transmits the information as status information to the Web application 310 (S714). The processing in S713 is not limited starting in response to the reception of the HTTP request in S712, but may be periodically executed as background processing independent of the request in S712.

If the Web application 310 receives the transmitted status information, the Web application 310 notifies the status of the job described by the status information and generates HTML data of a screen allowing a user of the MFP 102 to designate the next job to the MFP 102. The generated HTML data is transmitted to the Web browser 320 as an HTTP response to the HTTP request in S712 (S715). The HTML data generated here may be HTML data for displaying "END OF PROCESSING" on the screen if the transmitted status is "end of job" and allowing a user to initiate the next job on the MFP 102. For example, it is HTML data of a screen for displaying "IN PROCESSING" on the screen if the transmitted status is "Processing Job" and allowing the user of the MFP 102 to imitate the next job. If the Web browser 320 receives the HTML data transmitted in S715, the screen displays the execution status of the job in the MFP 103 and the screen allowing designation of a job to be executed next in the MFP 102 based on the HTML data. Thus, a user of the MFP 102 may designate the job to be executed next in the MFP 102 without waiting for the completion of the job being executed in the MFP 103. The execution status of the job being executed in the MFP 103 may be checked on the screen of the MFP 102. Until the status transmitted in S714 becomes "End of Job", the processing in S712 to S715 is repeated.

Figure 8:
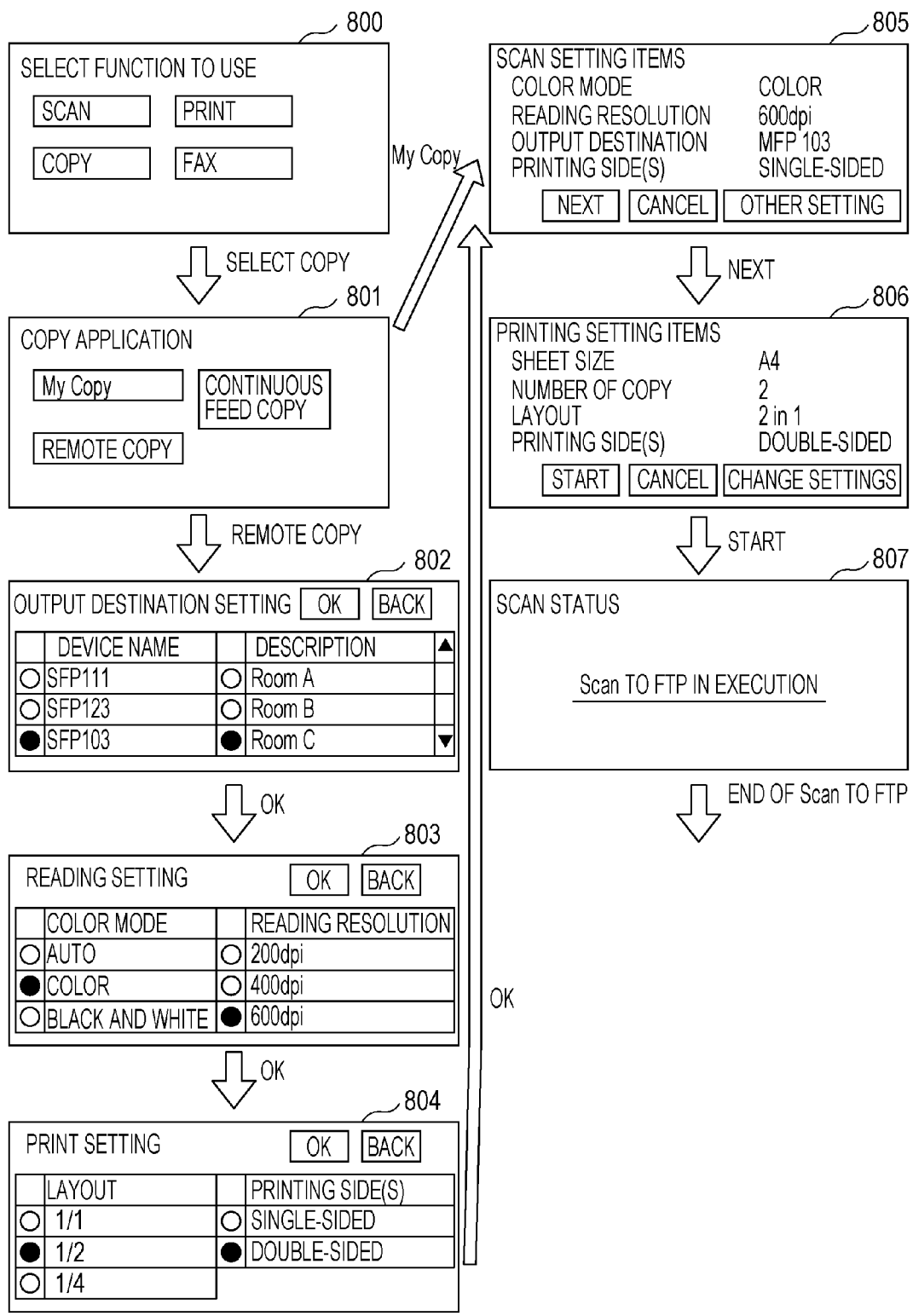
FIG. 8 is a diagram illustrating screen shifts during a series of operations in a Web system including a Web server and two MFPs according to an exemplary embodiment of the present invention.

FIG. 8 illustrates an example of the screen shift occurring during a series of operations in a Web system including MFP 102, MFP 103, and the Web server 101 according to the present embodiment. The screens are displayed on the Web browser 320 based on the HTML data generated by the Web application 310 in the Web server 101 and shift by a user operation or a control script.

A menu screen 800 is a screen for a user to select which function is to be used to use a function implemented by cooperative processing between the MFP 102 and MFP 103. For example, if the button corresponding to the function is pressed on the touch panel screen to select the function, the display shifts to the screen corresponding to the selected function. It is assumed here that a copy function is selected and the display shifts to a copy application screen 801.

The copy application screen 801 is a screen for selecting a Web application relating to the copy function. On this screen, "My Copy" is a function for performing copy processing by using the settings registered by a user in advance, such as the reading setting and print setting. When the Web application is selected, the setting using an output designation screen 802, a reading setting screen 803 or a print setting screen 804 may be omitted. It is assumed here that a user selects a "Remote Copy" function and that the display shifts to the destination designation screen 802.

The destination designation screen 802 is a screen for selecting an apparatus to print the image data read for executing a remote copy job. In other words, it is a screen for selecting a link destination apparatus in cooperative processing. In the example in FIG. 8, the MFP 103 is selected, and the OK button is pressed. The display then shifts to the reading setting screen 803.

The reading setting screen 803 is a screen for implementing detail setting regarding readings, such as a color mode and a reading resolution. After a user selects a desirable setting and presses the OK button, the display shifts to a print setting screen 804. The print setting screen 804 is a screen for implementing detail setting regarding printing, such as a layout and a printing side, when printing processing is performed in the apparatus selected on the destination designation screen 802. If a user selects a desirable setting and then presses the OK button, the display shifts to a scan setting check screen 805. A user may check the setting on the scan setting check screen 805 and press "NEXT" button if the setting is acceptable.

If the "NEXT" button is pressed on the scan setting check screen 805, the display shifts to a print-setting check screen 806 next. A user may check the setting on the screen and press the start button if the setting is acceptable. If the start button is pressed on the print-setting check screen 806, the "Scan To FTP" job, which is included in a remote copy job, is executed. The display shifts to a scan status screen 807. In this case, in response to pressing of the start button, the Web browser 320 transmits the HTTP request containing the execution instruction for a "Scan To FTP" job to the Web application 310.

If the Web application 310 instructs the execution of the "Scan To FTP" job in response thereto, the scan service provider in the MFP 102 starts the job. A scan status screen 807 is displayed based on the HTML data transmitted from the Web application 310.

Figure 10:
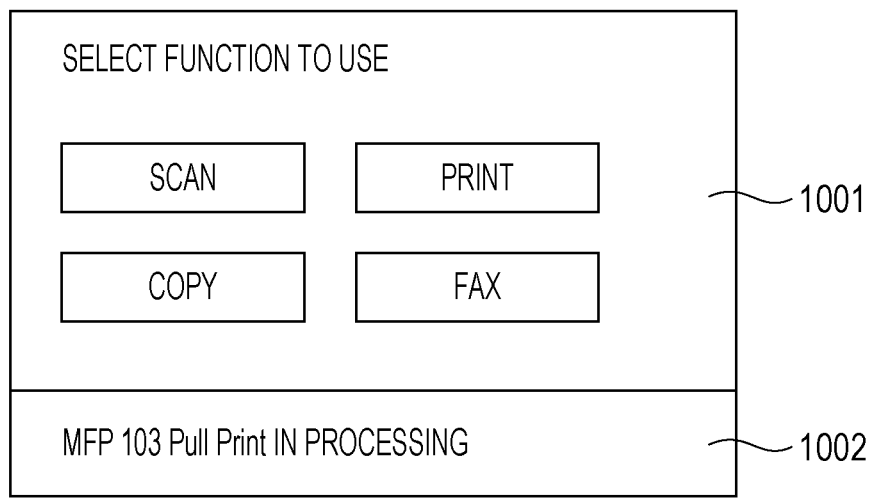
FIG. 10 illustrates an example of a screen to be displayed on a Web browser according to an exemplary embodiment of the present invention.

Next, the control script causes the Web browser 320 to periodically transmit an HTTP request to the Web application 310 and check the execution status of the job. When the "Scan To FTP" job ends, the screen, as illustrated in FIG. 10, is displayed. The illustrated screen allows notification of the execution status of the job to be executed by a link destination apparatus and designation regarding the next processing to the link source apparatus by a user of the link source apparatus. This screen is displayed on a Web browser included in the link source apparatus.

FIG. 10 illustrates an example of the screen to be displayed on the Web browser 320 of the MFP 102 when the processing in the MFP 102 ends in a Web system including the MFP 102, MFP 103 and Web server 101. At this point in time, because the reading processing by the MFP 102 has completed, more specifically the "SCAN To FTP" processing has completed, the next job is allowed to start. Thus, as illustrated in FIG. 10, an initial menu screen 1001 (such as a menu screen 800 in FIG. 8) is displayed to allow a user to designate the next job. Because it is a remote copy job, that is, a job with cooperative processing, the execution status of the printing processing in the MFP 103 is displayed. The execution status of the printing processing in the MFP 103 is displayed at a lowest predetermined region of the screen (screen 1002 in FIG. 10). This provides a user with the processing status of the cooperative processing, and the ability to designate to the link source apparatus the processing to be executed next.

When the printing processing by the MFP 103 ends, the job managing unit 315 updates the job management table again. The screen generating unit 313 refers to the updated job management table. If it is determined that the execution status of the job in the link destination apparatus is "END", the job execution status of the link destination apparatus displayed on the screen 1002 may be deleted. The part of the screen for displaying the job execution status of the link destination apparatus is not be limited to the example in FIG. 10, and can be displayed in any portion of the screen.

A second exemplary embodiment will now be described. The second embodiment is different from the first embodiment in the display form of the screen illustrated in FIG. 10. Because the system configurations and the hardware and software configurations of the two embodiments are the same, their descriptions are omitted herein.

According to the first embodiment, in cooperative processing performed by the MFP 102 and the MFP 103, the screen in FIG. 10 is displayed on the Web browser 320 of the MFP 102 when the processing in the MFP 102 ends. This screen displays the menu screen 1001 and the job execution status screen 1002 for the MFP 103. According to the second embodiment, the browser of the MFP 102 is a tab browser, screen 1001 and screen 1002 in FIG. 10 are controlled to display under separate tabs.

The second embodiment is different from the first embodiment in that the screen to be generated by the screen generating unit 313 is included in the Web server 101.

Figure 11:
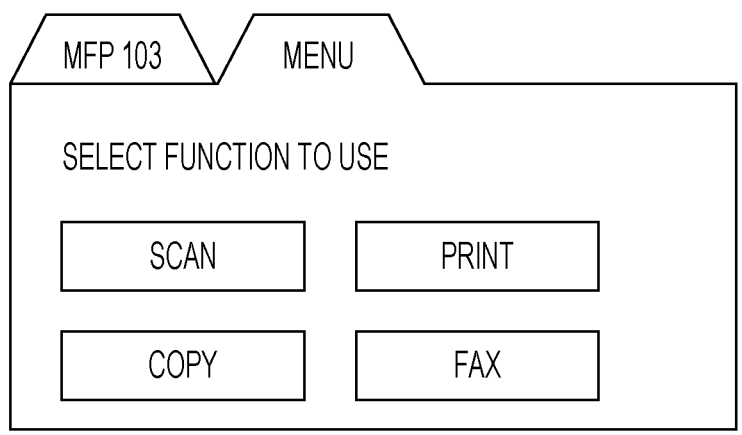
FIG. 11 illustrates an example of a screen to be displayed on a Web browser according to an exemplary embodiment of the present invention.
Figure 12:
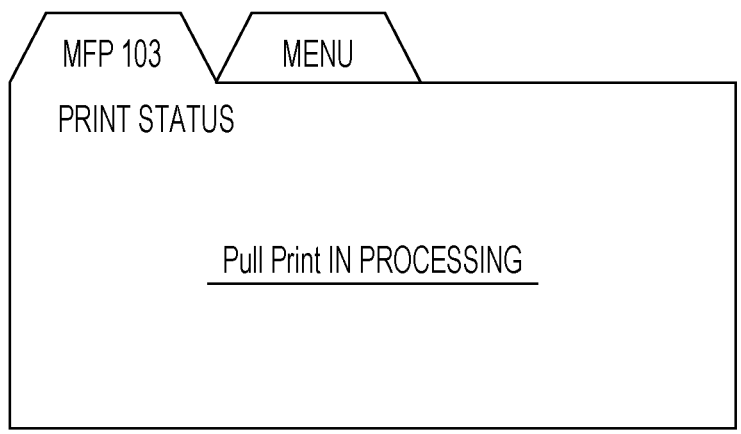
FIG. 12 illustrates an example of a screen to be displayed on a Web browser according to an exemplary embodiment of the present invention.

FIG. 11 illustrates an example of the screen to be displayed on the Web browser 320 when the processing in the MFP 102 ends in a Web system including the MFP 102, the MFP 103 and the Web server 101 according to the present embodiment. When the "SCAN To FTP" processing in the MFP 102 ends, an initial menu screen (such as the menu screen 800 in FIG. 8) is displayed on the front tab to allow a user to designate the next job. The screen displaying the execution status of the printing processing in the MFP 103 is displayed on a back tab. FIG. 12 illustrates the display example when a user selects the back tab. The screen generating unit 313 included in the Web server 101 according to the present embodiment generates HTML data for displaying the screens in FIG. 11 and FIG. 12 and transmits it to the Web browser 320, instead of the HTML data of the screen illustrated in FIG. 10 of the first embodiment.

According to the present embodiment, a user is provided with the processing status of cooperative processing and is able to designate the processing to be executed next to the link source apparatus. According to the present embodiment, the screen displaying the processing status of cooperative processing, the screen allowing designation of the processing to be executed next to the link source apparatus are displayed on separate tabs on the Web browser. This allows the information to be clearly displayed even when an apparatus has a display unit having a physically limited display size. When cooperative processing is to be performed with many link destination apparatuses, the statuses of the link destination apparatuses may be checked simply by changing the tabs.

Figure 13:
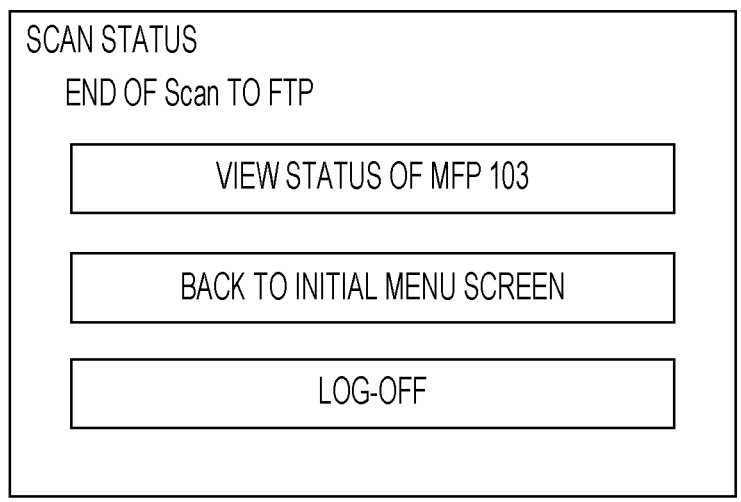
FIG. 13 illustrates an example of a screen to be displayed on a Web browser according to an exemplary embodiment of the present invention.

In another exemplary embodiment, the display example illustrated in FIG. 13 may be implemented instead of the tab-form display examples in FIG. 11 and FIG. 12. When the "SCAN To FTP" processing in the MFP 102 ends, the screen in FIG. 13 is displayed on the Web browser 320. On the screen in FIG. 13, a user is able to select the next display of the initial menu (such as the menu screen 800 in FIG. 8), the screen displaying the execution status of the printing processing in the MFP 103, or to log-off and stop the display on the Web browser 320. In accordance with the selection by a user on the screen, the Web browser 320 may acquire the HTML data on the corresponding screen from the Web application.

In the present embodiment the HTML data on the screen is not acquired until the display is designated, thus enabling memory usage used for holding the screen data to be reduced. In another embodiment, the cooperative processing can be achieved without the use of a Web server. Instead of the cooperative processing by the MFP 102 and the MFP 103 being executed through the Web server 101, the data processed by the MFP 102 can be transmitted and be processed directly to and in the MFP 103. In the present embodiment, the operation screens for cooperative processing can be exchanged between the MFP 102 and the MFP 103.

According to the aforementioned embodiments, the cooperative processing in which a plurality of image processing apparatuses work together is remote copy. However, any other processing, such as scanning, printing, etc., that would enable practice of the above-identified embodiments is applicable. While the above-described embodiments described the use of two image processing apparatuses to implement the cooperative processing, the number of image processing apparatuses is not limited to two, and any number of image processing apparatuses could be employed.

According to the aforementioned embodiments, the screens in FIG. 10 to FIG. 13 are displayed in the MFP 102, which is a link source apparatus, and are displayed when the processing in the MFP 102 ends. However, the timing for displaying the screens is not limited thereto. The screens may be displayed anytime after receipt of the next job is allowed after the link source apparatus executes a job based on the cooperative processing. For example, the screens may be displayed when the reading operation by the link source apparatus ends and removing a manuscript and setting the next manuscript are allowed. At that time, the completion of the job to be executed by the link source apparatus may not be required.

According to the aforementioned embodiments, an apparatus, excluding the image processing apparatuses, performing cooperative processing provides screen information on the image processing apparatuses. However, other apparatus may provide the screen information. For example, a link destination apparatus performing cooperative processing may provide screen information to a link source apparatus. In this case, the link destination apparatus includes a Web server function and operates as an external device which provides screen information.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-265744, filed Nov. 29, 2010, which is hereby incorporated by reference herein in its entirety.

What is claimed is:

1. An image processing apparatus comprising:
a first receiving unit configured to receive, from an external apparatus via a network, screen information generated by the external apparatus;
a displaying unit configured to display, based on first screen information received by the first receiving unit, a first screen for allowing a user to designate cooperative processing being implemented by first processing executed by the image processing apparatus and second processing executed by other image processing apparatus; and
a processing unit configured to execute the first processing in a case where the user designates execution of the cooperative processing via the first screen,
wherein after the processing unit executes the first processing, the displaying unit displays a second screen based on second screen information received by the first receiving unit, the second screen allowing the user to check a status of the second processing executed by the other image processing apparatus and to designate execution of subsequent processing.

2. The image processing apparatus according to claim 1, wherein the displaying unit displays, as the second screen, a screen including information indicating the status of the second processing and an execution button for designating execution of the subsequent processing.

3. The image processing apparatus according to claim 1, wherein the second screen includes a first tab and a second tab, the first tab displaying information indicating the status of the second processing and the second tab displaying an execution button for designating execution of the subsequent processing.

4. The image processing apparatus according to claim 1, wherein the screen information received by the first receiving unit is HTML data generated by the external apparatus.

5. The image processing apparatus according to claim 1, further comprising:
a notifying unit configured to notify, in a case where the user has designated execution of the cooperative processing via the first screen, the external apparatus that the execution of the cooperative processing has been designated by the user; and
a second receiving unit configured to receive, from the external apparatus, an instruction for executing the first processing generated by the external apparatus in response to the notification from the notifying unit,
wherein the processing unit executes the first processing based on the instruction for executing the first processing received by the second receiving unit.

6. The image processing apparatus according to claim 1, further comprising:
a reading unit configured to generate image data by reading a document,
wherein the cooperative processing is implemented by the first processing in which the reading unit generates the image data and the second processing in which the other image processing apparatus prints the image data generated by the reading unit in the first processing.

7. The image processing apparatus according to claim 1, wherein the displaying unit is a web browser.

8. A control method for an image processing apparatus, the method comprising:
receiving, from an external apparatus via a network, screen information generated by the external apparatus;
displaying, based on first screen information received, a first screen for allowing a user to designate cooperative processing being implemented by first processing executed by image processing and second processing executed by other image processing; and
executing the first processing in a case where execution of the cooperative processing is designated via the first screen, and
after the first processing, displaying a second screen based on second screen information received, the second screen allowing the user to check a status of the second processing executed by the other image processing apparatus and to designate execution of subsequent processing.

9. A non-transitory computer-readable storage medium storing a program for causing a computer to execute the steps of the control method according to claim 8.

10. A web system comprising:
a server;
a first image processing apparatus; and
a second image processing apparatus, wherein the server provides a generating unit configured to generate screen information, wherein the first image processing apparatus provides:
- a first receiving unit configured to receive, from the server, first screen information generated by the server;
- a displaying unit configured to display, based on first screen information received by the first receiving unit, a first screen for allowing a user to designate cooperative processing being implemented by first processing executed by the first image processing apparatus and second processing executed by the second image processing apparatus; and
- a first processing unit configured to execute the first processing in a case where the user designates execution of the cooperative processing via the first screen, wherein, after the first processing unit executes the first processing, the displaying unit displays a second screen based on second screen information received by the first receiving unit, the second screen allowing the user to check a status of the second processing executed by the second image processing apparatus and to designate execution of subsequent processing, and wherein the second image processing apparatus provides a second processing unit configured to execute the second processing.

* * * * *